United States Patent
Jam et al.

(10) Patent No.: US 6,837,433 B2
(45) Date of Patent: *Jan. 4, 2005

(54) VARIABLE FOCAL LENGTH IMAGING DEVICE

(75) Inventors: Mehrban Jam, Fremont, CA (US); Geoff Lyon, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 34 days.

This patent is subject to a terminal disclaimer.

(21) Appl. No.: 10/136,830

(22) Filed: Apr. 30, 2002

(65) Prior Publication Data

US 2003/0201327 A1 Oct. 30, 2003

(51) Int. Cl.⁷ .............................................. G06K 7/10
(52) U.S. Cl. ........................ 235/462.22; 235/462.01; 235/462.23
(58) Field of Search ................. 235/462.12, 462.01, 235/462.1, 462.11, 462.2, 462.22, 462.23, 462.24, 462.25

(56) References Cited

U.S. PATENT DOCUMENTS

| | | | | |
|---|---|---|---|---|
| 5,308,966 A | * | 5/1994 | Danielson et al. | 235/462.23 |
| 5,378,883 A | * | 1/1995 | Batterman et al. | 235/462.21 |
| 5,640,001 A | * | 6/1997 | Danielson et al. | 235/462.23 |
| 6,053,408 A | * | 4/2000 | Stoner | 235/462.22 |
| 6,138,915 A | * | 10/2000 | Danielson et al. | 235/472.02 |
| 6,283,374 B1 | * | 9/2001 | Fantone et al. | 235/462.45 |
| 6,585,157 B2 | * | 7/2003 | Brandt et al. | 235/462.07 |
| 6,609,660 B1 | * | 8/2003 | Stoner | 235/462.22 |

* cited by examiner

Primary Examiner—Thien M. Le
Assistant Examiner—April Taylor

(57) ABSTRACT

A variable focal length imaging device. The device has an image-sensing component and a variable focal length lens in visual cooperation with the image-sensing component. The variable focal length lens has a focal length that varies across its surface such that a different portion of the lens focuses, onto different regions of the sensing component, objects at different distances from the lens. In this fashion, the device is able to read symbols at varying distances from the device.

34 Claims, 8 Drawing Sheets

VARIABLE FOCAL LENGTH IMAGING DEVICE

TECHNICAL FIELD

The present invention relates to the field of digital imaging. Specifically, the present invention relates to a device having a variable focal length lens for reading barcodes.

BACKGROUND ART

Barcodes have become a ubiquitous way of coding information in a machine-readable form because of the ease with which barcodes may be scanned, processed, stored, etc. via an electronic device. This allows for an accurate and rapid process. However, factors such as cost, power consumption, size, weight, accuracy, ease of use, location of scanner relative to barcode, etc. limit the applications for which conventional barcode scanners are suitable.

One problem with reading barcodes is that the image of the barcode must be sufficiently focused on a sensing component in order to accurately decipher the barcode pattern. The best-known conventional way of reading barcodes is with laser scanners, which have become standard at department and grocery stores. Such devices operate by emitting a beam of laser light, which strikes the surface of the object on which the barcode is imprinted and is then reflected back to the scanning device. Because laser beams are coherent, laser scanners are not subject to significant focusing problems. However, laser scanners are mechanically complex and consequently are relatively expensive and heavy. Also, mechanical devices tend to break down much faster than, for example, a device with no moving mechanical parts.

In order to properly read a barcode, a laser scanner typically has at least one rotating mirror and perhaps several fixed mirrors, upon which a laser beam is reflected before leaving the scanner. The laser scanner may emit multiple such beams as the mirror(s) rotate. In this fashion, the scanner may trace laser beam lines having various angles with respect to one another on the surface containing the barcode. Because the lines will be at various angles with respect to one another, it is likely that at least one line will trace across the entire barcode, thus allowing the barcode to be read. The beams then reflect off the surface containing the barcode and return to the scanner where signal processing interprets the barcode.

Unfortunately, such laser scanners use considerable power. First, considerable power is needed for the laser, and second, considerable power is needed for the motor to rotate the mirror(s). While power consumption may not be a severe issue in a retail store application, power consumption is of great concern if the scanning device is to be used in the field. For example, it is desirable to allow a user without access to an electrical outlet to scan barcodes.

Two further problems with such laser scanners are their size and weight. The motors, mirrors, lasers, etc. just described make the scanner heavy and bulky. However, a relatively lightweight and compact solution is desired for a user in the field.

Another type of barcode reader emits a single incoherent point light source, usually infra-red, and detects its reflection without using rotating mirrors. A single light source is emitted from the barcode reader, reflected off the object with the barcode, and read by a single detector that is generally nearby the light source. While these readers do not require rotating mirrors, the barcode reader must be swiped across the barcode manually to obtain an accurate reading. For example, the barcode reader must be physically touching the object with the barcode or at least be within a few millimeters for the light to reflect back properly for an accurate reading. This leads to error prone measurements, barcode reader wear, and slow operating speed.

It has also been suggested that a digital camera be used to read barcodes. However, instead of using laser light, digital cameras generally use visual or infrared light. As such, focusing the image of the barcode on the sensing array of the camera is very problematic. Consequently, this requires that the barcode always be the same distance from the camera to ensure the barcode is in focus on the sensing array. A conventional solution requires the scanning device to touch the barcode or be a fixed distance away, often no more than a few millimeters.

Thus, one problem with conventional barcode scanning devices is they consume too much power, and thus may be unsuitable for a battery operated device. Another problem with conventional devices is that they have too many moving mechanical parts and are thus too unreliable. Another problem with conventional devices is that that are heavy and bulky. Another problem with some conventional devices is that they require the scanner to be placed either very close to or touching the object with the barcode.

DISCLOSURE OF THE INVENTION

The present invention pertains to a variable focal length imaging device. The device has an image-sensing component and a variable focal length lens in visual cooperation with the image-sensing component. The variable focal length lens has a focal length that varies across its surface such that a different portion of the lens focuses, onto different regions of the sensing component, objects at different distances from the lens. In this fashion, the device is able to read symbols at varying distances from the device.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
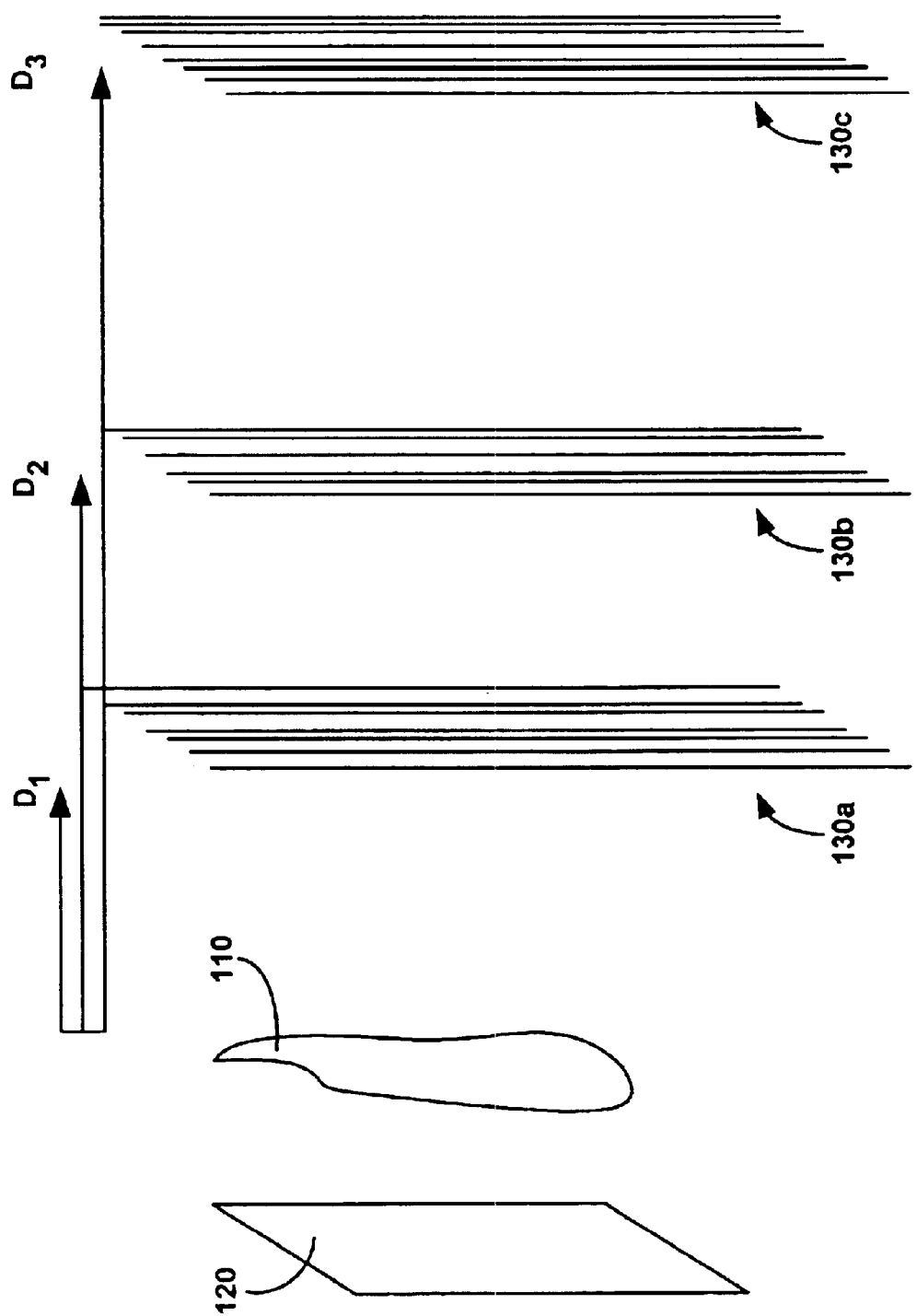
FIG. 1 is a diagram illustrating a variable focal length imaging device, according to an embodiment of the present invention.

In the following detailed description of the present invention, numerous specific details are set forth in order to provide a thorough understanding of the present invention. However, the present invention may be practiced without these specific details or by using alternate elements or methods. In other instances well known methods, procedures, components, and circuits have not been described in detail as not to unnecessarily obscure aspects of the present invention.

A barcode reader according to various embodiments of the present invention has an image-sensing component and a variable focal length lens in visual cooperation with the image-sensing component. The image-sensing component may be a charge-coupled device (CCD), a complimentary metal-oxide-semiconductor (CMOS) imaging device, or the like. The variable focal length lens has a focal length that varies across its surface. In this fashion, objects at different distances from the lens are focused onto the image-sensing component by different portions of the lens. For example, if a barcode is far away from the barcode reader a different portion of the lens will be focusing the barcode on the image-sensing component than if the barcode is close-by. Thus, different regions of the sensing component may focus objects that are at different distances from barcode reader. If the barcode reader is properly oriented, at least a portion of the barcode will be in focus on some region of the image-sensing component.

The barcode reader may further have a software program for processing data from the sensing component to recreate and decode the barcode. For example, the barcode may need to be recreated because only a portion of it is in focus at a given time. The barcode reader may be angled slightly to capture and focus as much of the barcode as is needed to fully decode it. The software program may stitch together various portions of the barcode to recreate the barcode, or at least the minimum amount of the barcode needed to decode it. For example, it is possible to decode the barcode with a single fine stripe oriented perpendicular to the bars. In this fashion, the width of the bars and spaces there-between may be determined.

However, the present invention is not limited to reading barcodes that are made up of 'bars'. For example, some barcodes are linear and may code their information in a series of bars of varying width and with the spaces between the bars varying. Other barcodes are referred to as two-dimensional barcodes. One example of a two-dimensional barcode has a target in the middle (e.g., concentric circles) with a number of objects around the target positioned to code the information. The objects may be, for example, dots, circles, polygons, etc. Another example of a two-dimensional barcode is a series of linear barcodes stacked one on top of the other.

Furthermore, embodiments of the present invention are not limited to reading barcodes. For example, other machine-readable symbols that are used to convey information may also be read. The information may be encoded in some fashion; however, this is not required. For example, embodiments may be used to read symbols such as, for example, alphanumeric characters by performing optical character recognition (OCR). Thus, embodiments are able to read these symbols, as well as others.

Embodiments of the present invention provide for a barcode reader using relatively little power, which may be suitable for a battery operated device. Embodiments have few or no moving mechanical parts, and are thus highly reliable. Embodiments are lightweight and compact. Embodiments may read a barcode whether it is very close or very far from the barcode reader.

FIG. 1 illustrates a side view of an embodiment having a progressive lens 110 and an image-sensing component 120. The progressive lens 110 may have a variable focal point across its surface such that different portions of the progressive lens 110 focus objects 130 at different distances from the progressive lens 110. For example, a portion of the progressive lens 110 near the bottom may focus onto a portion of the image-sensing component 120 the object 130a, which is at distance D1 from the progressive lens 110. It may be that only a portion (e.g., the lower portion) of object 130a is in focus on the image-sensing component 120. Because all information necessary to decode the object 130a may reside in the focused region, the object 130a (e.g., a barcode) is fully decodable even though a portion of it is out of focus.

Still referring to FIG. 1, a portion of the progressive lens 110 near the middle may focus the object 130b, which is at distance D2 from the progressive lens 110. (Or at least a portion of object 130b is focused). The object 130b may be imaged on a different region of the image-sensing component 120 than object 130a. Furthermore, a portion of the progressive lens 110 near the top may focus the object 130c, which is at distance D3 from the progressive lens 110. The progressive lens 110 may have a focal length that varies continuously across its surface, although this is not required. For example, a first region of the progressive lens 110 may have the same focal length as a second distinct region.

Still referring to FIG. 1, it may be that a portion of the object 130 is in focus in one region of the image-sensing component 120 and out of focus in other regions of the image-sensing component 120. By in focus it may be meant that it is focused well enough to be read and decoded with satisfactory accuracy. Thus, the definition of focus may not necessarily be an absolute measure of focus on the image-sensing component 120. Rather, focus may be relative to the particular application and the sophistication of data processing algorithm. For example, an image that is sufficiently focused for one application may not be sufficiently focused for another application. The degree of focus may vary continuously across the image-sensing component 120; however, for purposes of discussion, it may be stated that some regions are in focus and other regions are out of focus.

Figure 2:
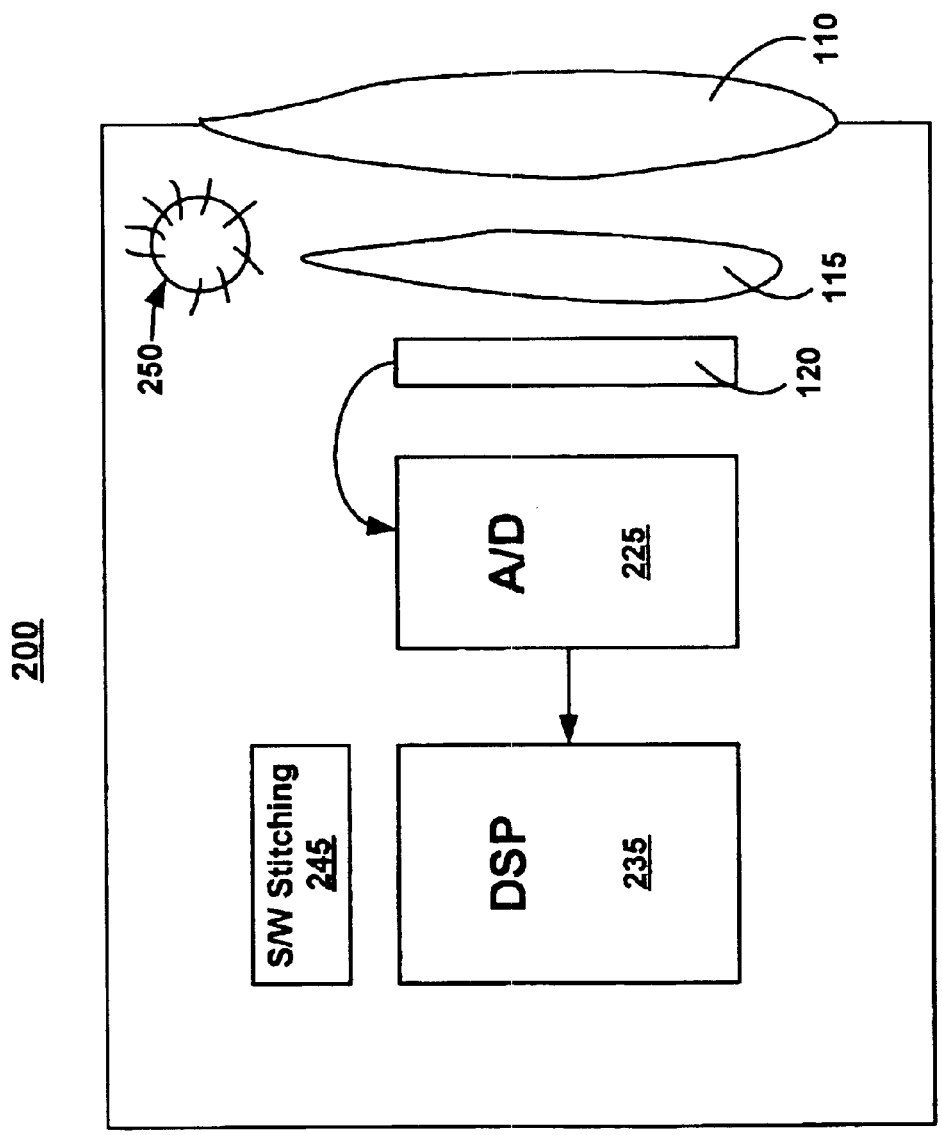
FIG. 2 is a diagram of a portable electronic device having a variable focal length lens for reading barcodes, according to an embodiment of the present invention.

FIG. 2 shows another device for reading symbols such as barcodes or the like. The device in FIG. 2 may be a portable electronic device 200, such as, for example, a digital camera, a personal digital assistant (PDA), a mobile phone, etc. In addition to a progressive lens 110 and an image-sensing component 120 (e.g., an image-sensing array), the portable electronic device 200 may have a main lens 115 between the progressive lens 110 and the image-sensing component 120. An analog-to-digital converter 225 (A/D) coupled to the image-sensing component 120 converts the analog image data from the image-sensing component 120 for the digital signal processor 235 (DSP). The portable electronic device 200 may further comprise a software stitching program 245 for interpreting a symbol (e.g., for recreating a barcode from the image data). The DSP 235 or other software may determine whether the barcode is focused sufficiently to properly decode. An edge detection algorithm may be used for this, although this example is not limiting. The portable electronic device 200 may optionally have a light 250 for illuminating the barcode.

Figure 3A:
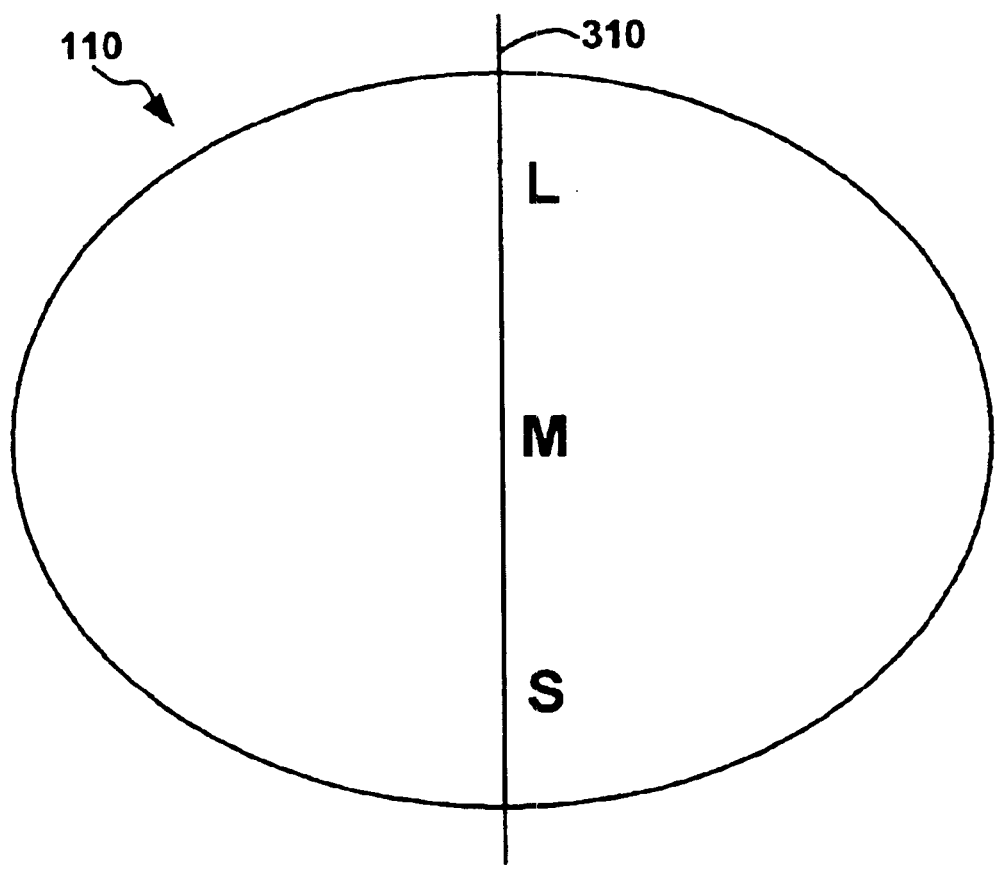
FIG. 3A and FIG. 3B are illustrations of exemplary lenses having a variable focal length across their surfaces, according to embodiments of the present invention.

Referring now to FIG. 3A, an exemplary progressive lens 110 is illustrated. It may be that the focal length of the progressive lens 110 varies progressively across an axis 310 of the progressive lens 110. The progressive lens 110 may be shaped to cause objects at varying distances from the progressive lens 110 from approximately a few millimeters to approximately infinity to be in focus on at least one region of the image-sensing component 120, although this is not required. For example, the focal length near the top of the progressive lens 110 may be relatively long (L), near the bottom it may be relatively short (S), and near the middle it may be intermediate (M). Dividing the lens 110 into three areas is done to make discussion convenient; the focal length may vary continuously across the surface. In this fashion, objects may be in focus progressively across an axis of the image-sensing component 120 according to their distance from the progressive lens 110. However, the focal length may vary across the surface of the progressive lens 110 in other fashions. For example, it is not required that the focal length vary from long to short across an axis 310 of the progressive lens 110.

Figure 3B:
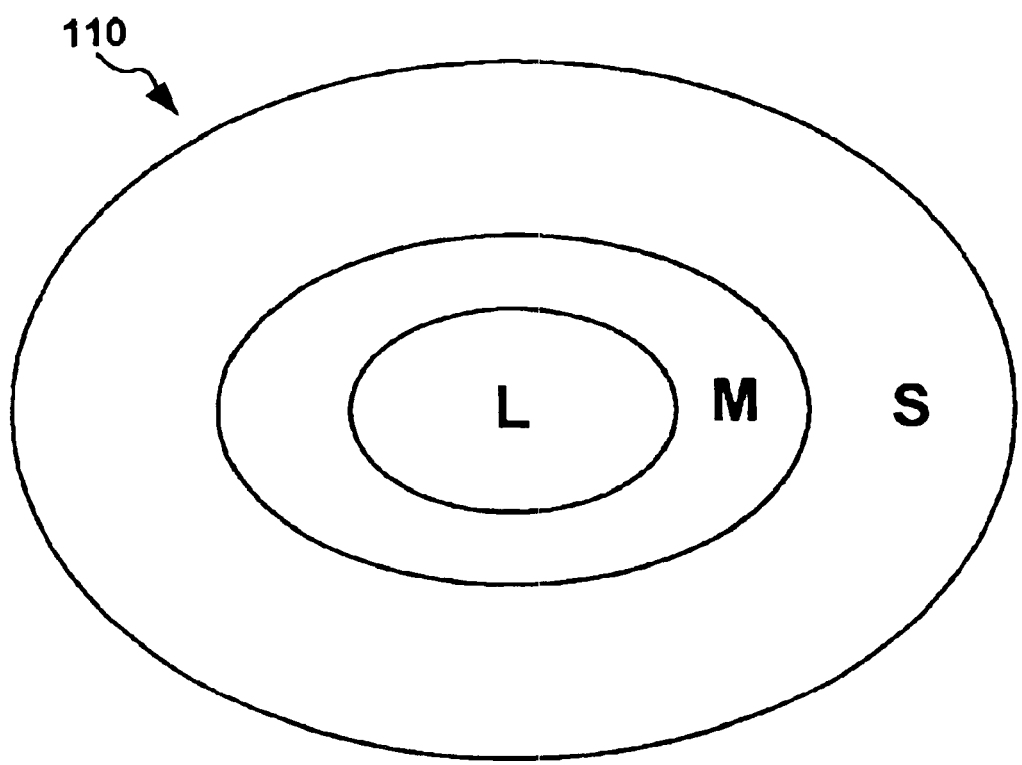

Referring now to FIG. 3B, an alternative embodiment has a progressive lens 110 which has a relatively long focal length (L) in the middle of the lens, a relatively short focal length (S) near the outer edge, and intermediate focal length (M) in between. Thus, the focal length does not vary from long to short across a single axis, but varies across multiple axes. Many other patterns of varying the focal length of the progressive lens 110 progressively across its surface are also possible. The progressive lens 110 may also be of any suitable shape in the plane shown in FIGS. 3A and 3B (e.g., circular, elliptical, rectangular, polygonal, etc.).

Thus, referring to FIGS. 4A–4D, it may be that an image falling on the top of the image-sensing component 120 will be in focus if the object 130 from which the image is formed is at a relatively far distance from the progressive lens 110; an image falling in the middle of the image-sensing component 120 may be in focus if the object is at a medium range of distances; and an image falling on the bottom of the image-sensing component 120 may be in focus if the object is at a close range of distances. Breaking the image-sensing component 120 into three regions is done merely for convenience in discussion. A multitude of such regions could also be described.

Figure 4A:
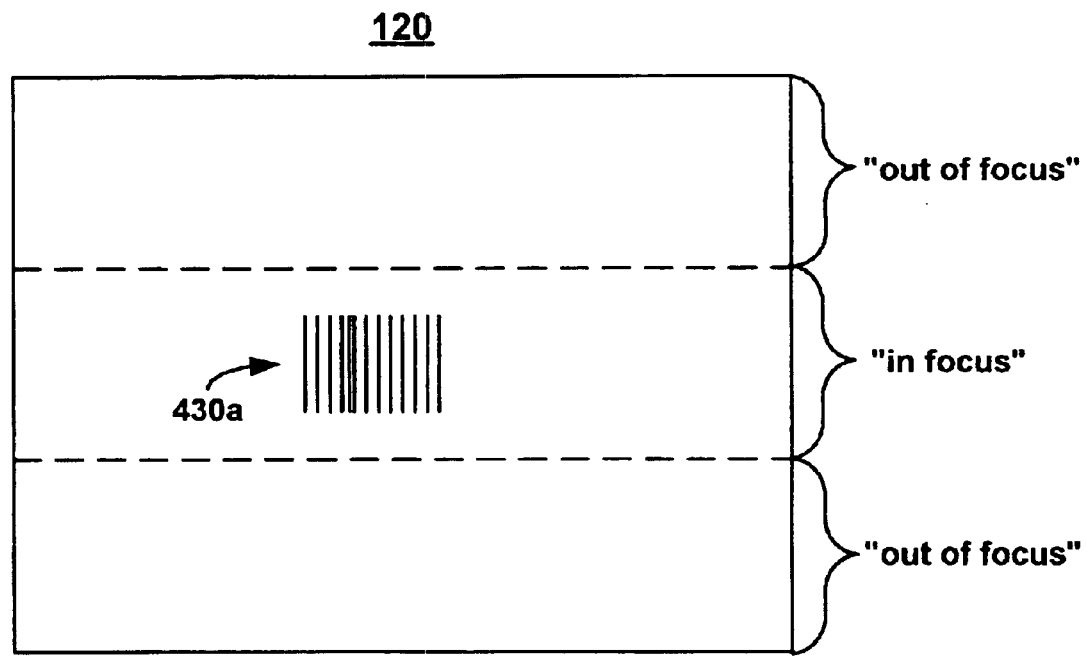
FIGS. 4A–4D are diagrams illustrating image-sensing arrays having an image of a barcode on a region thereof, according to embodiments of the present invention.
Figure 4B:
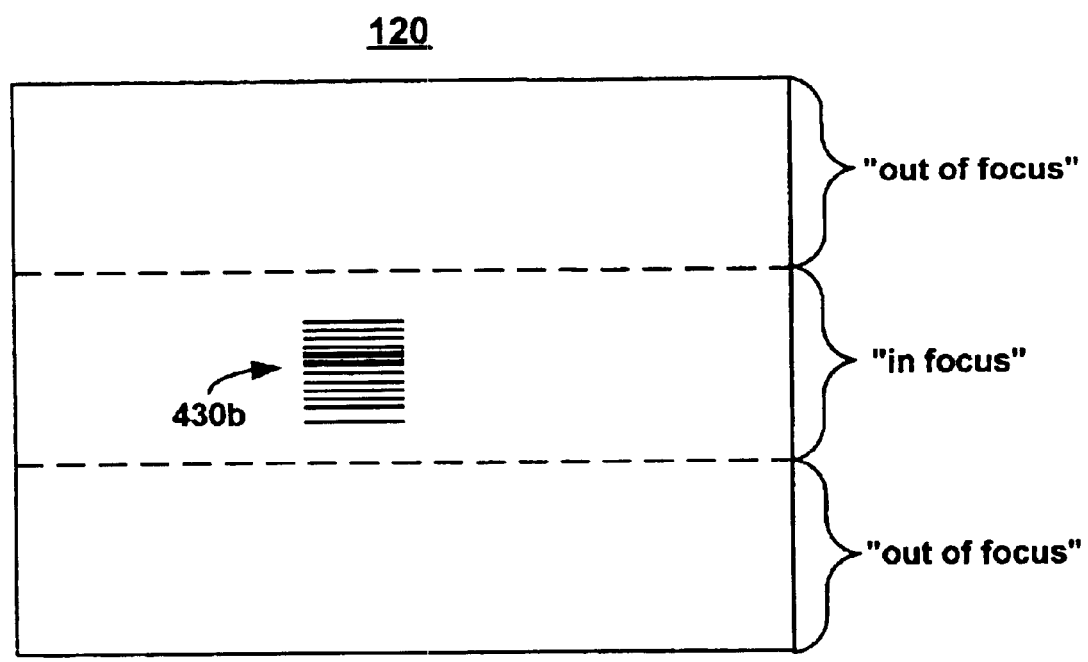
Figure 4C:
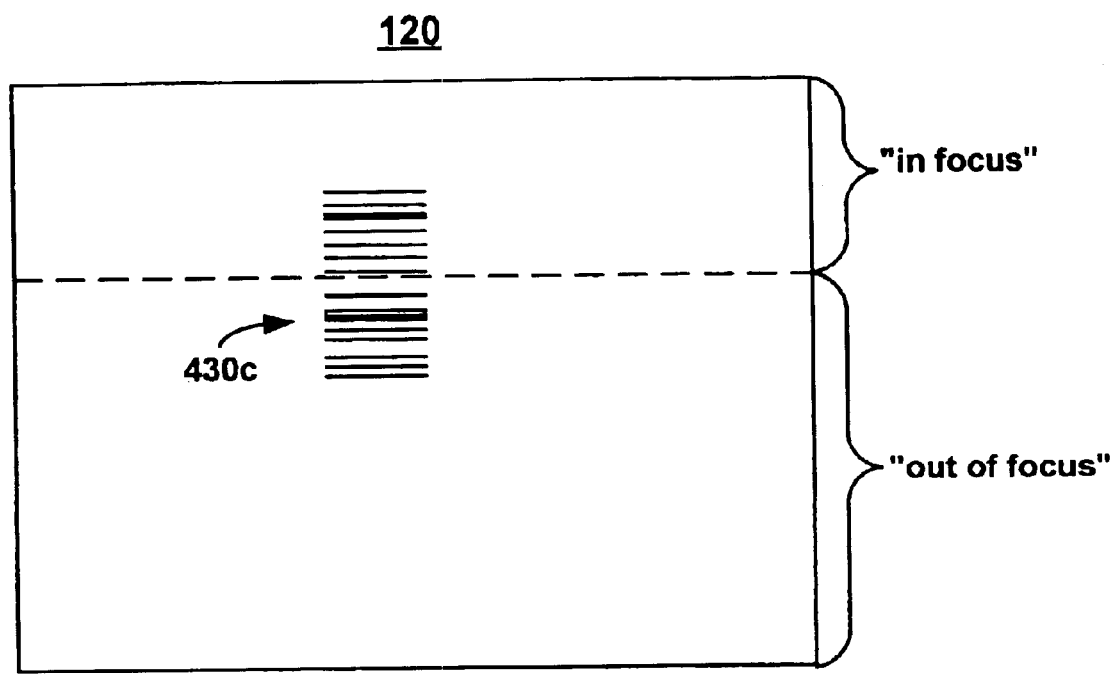

Depending on how the image of the object 130 falls onto the image-sensing component 120, it may be that all, some, or none of the object 130 is in focus. (Again, focused may mean sufficiently focused that data from the image-sensing component 120 may be processed to decode the barcode with suitable accuracy for the application.) Provided the device is oriented to receive a portion of a barcode on a portion of the image-sensing component 120 in which it is sufficiently focused, that portion of the barcode is readable. The device is able to read the barcode with data captured at a single point in time if the portion of the barcode comprises sufficient information to decode the barcode. For example, the device is able to read the barcode with data captured at a single point in time if the portion of the barcode comprises at least a portion of each bar of the barcode, such as illustrated in FIG. 4A, FIG. 4B, and FIG. 4D, for example.

In some cases, regardless of the angle that the barcode is at with respect to an x-y axis of the image-sensing component 110 it may be decoded with data captured at a single point in time. For example, in both FIG. 4A and FIG. 4B the images 430a and 430b may be decoded because sufficient portions of the barcodes fall within the focused region of the image-sensing component 120. The in-focus region could just as well be the upper or lower portion of the image-sensing array 120.

However, in some cases the angle in which the image strikes the image-sensing component 120 may prevent decoding the barcode with data captured at one point in time. For example, in FIG. 4C a barcode 430c, which falls into both in-focus and out of focus regions, may not be fully decoded because some of the bars of the barcode 430c are in an unfocused region. In this case, the device is able to fully decode the barcode by angling the device to capture necessary barcode information on a portion of the image-sensing component in which it is sufficiently focused to be read. For example, a user angles the device slightly such that upper and lower portions of the barcode 430c fall into the focused region. The device may emit a signal such as a beep to alert the user that the barcode has been successfully decoded. The user need not adjust the distance between the device and the barcode to focus the barcode. Furthermore, it is not necessary to alter the distance between the progressive lens 110 and the image-sensing component 120.

Figure 4D:
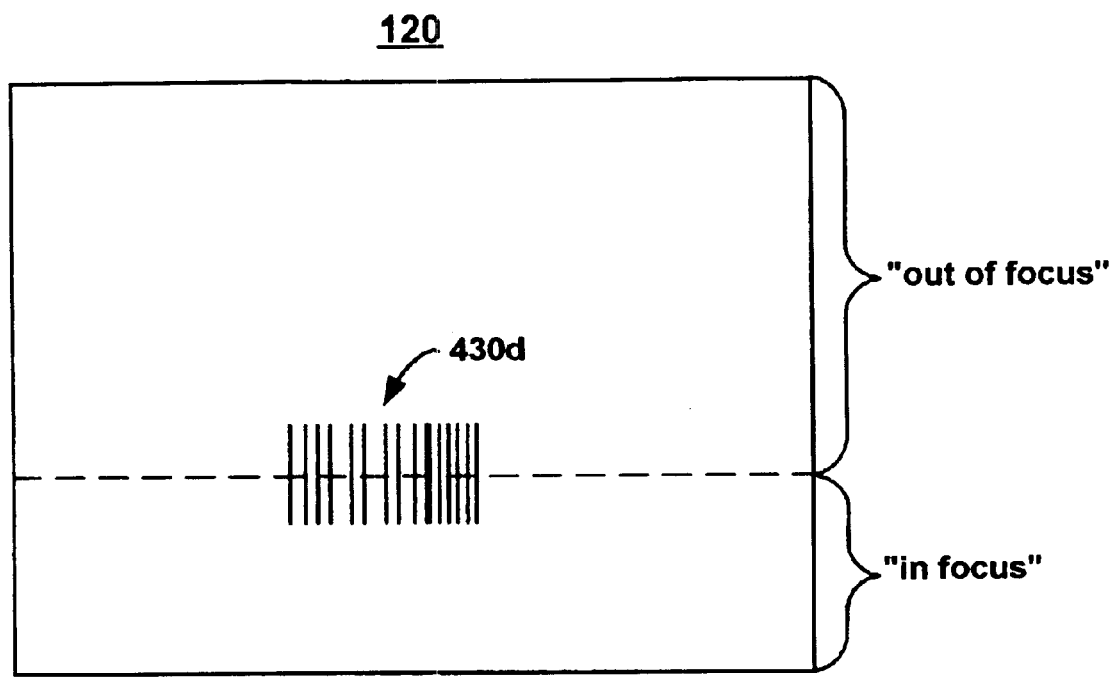

FIG. 4D illustrates a case in which the barcode image 430d falls partly into a focused region and partly into an unfocused region. However, in this case it may be fully decoded as a portion of each bar falls in the focused region. For example, the image-sensing component 120 may comprise an array of pixels, wherein the barcode may be decoded by being sufficiently focused to be read from data collected at a line of pixels running across all bars of the barcode image 430d. However, an object at the same distance from the device to the barcode (e.g., other portions of the barcode) may be out of focus another substantial group of pixels of the image-sensing component 120. By a substantial group of pixels, it may be meant that more than a few of the remaining pixels. For example, several lines of pixels at the top of barcode image 430d may be out of focus.

While the present invention has been described in particular embodiments, it should be appreciated that the present invention should not be construed as limited by such embodiments, but rather construed according to the below claims.

What is claimed is:

1. A variable focal length imaging device, comprising:
   an image-sensing component; and
   a variable focal length lens optically coupled with said image-sensing component, wherein said variable focal length lens has a focal length which varies across a surface of said lens such that different portions of said lens focus, onto different regions of said image-sensing component, objects at different distances from said lens, wherein said device is able to image symbols at varying distances from said device.

2. The device of claim 1, wherein said variable focal length imaging device is a barcode reader.

3. The device of claim 1, further comprising a software program for processing data from said image-sensing component to interpret said symbols.

4. The device of claim 3, wherein said symbols comprise barcodes.

5. The device of claim 3, wherein said symbols comprise alphanumeric characters.

6. The device of claim 3, wherein said software program is operable to stitch together data collected from said image-sensing component at different times to recreate at least a portion of a symbol, and wherein said different times correspond to times when different portions of said symbol are sufficiently focused on a region of said sensing component to process and interpret said different portions of said symbol.

7. The device of claim 1, wherein said image-sensing component is a charge coupled device (CCD).

8. The device of claim 1, wherein said image-sensing component is a complimentary metal-oxide-semiconductor (CMOS) imaging device.

9. The device of claim 1, wherein the focal length of said lens varies progressively across an axis of said lens, wherein symbols are in focus progressively across an axis of said image-sensing component, according to distance of the symbols from said lens.

10. The device of claim 1, wherein the focal length of said lens varies progressively across multiple axes of said lens.

11. The device of claim 1, wherein said device is operable to focus symbols at a range from a few millimeters to approximately infinity on at least one region of said image-sensing component without moving said lens relative to said image-sensing component.

12. A device for decoding barcodes, comprising:
a lens having a focal length that varies across a surface of said lens;
an image-sensing component;
a software program coupled to said image-sensing component, said program for processing data from said component to decode a barcode; and
wherein said lens is at a fixed position relative to said image-sensing component, wherein light from a different portion of said lens brings objects at different distances from said lens substantially into focus at different regions of said component, and wherein provided said device is oriented to receive a portion of said barcode on a portion of said component in which the barcode is sufficiently focused, said portion of said barcode is readable.

13. The device for decoding barcodes of claim 12, wherein:
said device is operable to decode said barcode with data captured at a single point in time if said portion of said barcode comprises sufficient information to decode said barcode.

14. The device for decoding barcodes of claim 12, wherein:
said device is operable to decode said barcode with data captured at a single point in time if said portion of said barcode comprises a portion of each bar of said barcode, said barcode being a linear barcode.

15. The device for decoding barcodes of claim 12, wherein:
if said device is not properly oriented to fully decode said barcode, said device is operable to fully decode said barcode by said device being oriented to capture necessary barcode information on a portion of said image-sensing component in which the barcode is sufficiently focused to be read.

16. The device for decoding barcodes of claim 15, wherein:
said device is able to focus an image of said barcode on said image-sensing component without altering the distance between said device and said barcode.

17. The device for decoding barcodes of claim 15, wherein:
said device is able to decode said barcode without altering the distance between said device and said barcode.

18. The device for decoding barcodes of claim 15, wherein:
said device is able to decode said barcode without altering the distance between said lens and said image-sensing component.

19. The device for decoding barcodes of claim 15, wherein:
said device is able to focus an image of said barcode on said image-sensing component without altering the distance between said lens and said component.

20. The device of claim 12, wherein said image-sensing component comprises an array of pixels and wherein said device is able to decode said barcode if an image of said barcode is sufficiently focused to be read from data collected at a line of pixels running across all bars of said image, and further wherein an object at the same distance from said device to said barcode is out of focus in another substantial group of pixels of said component.

21. The device of claim 12, wherein said lens is shaped to cause objects at varying distances to said lens from a few millimeters to approximately infinity to be in focus on at least one region of said image-sensing component.

22. The device of claim 12, further comprising a main lens between said variable focal length lens and said image-sensing component, said main lens receiving an image from said variable focal length lens and directing the image to said component.

23. A portable electronic device, comprising:
an image-sensing array;
a progressive variable focal length lens focusing light on said image-sensing array, wherein said variable focal length lens has a focal length that varies across a surface of said lens such that a different portion of said lens focuses objects at different distances from said lens at different regions of said image-sensing array;
an analog-to-digital converter coupled to said image-sensing array for receiving analog image data from said sensing array and converting to digital data; and
a digital signal processor coupled to said analog-to-digital converter.

24. The portable electronic device of claim 23, further comprising a software stitching program for recreating a barcode from said image data, wherein said image data is captured at different times.

25. The portable electronic device of claim 24, wherein said software stitching program further is for decoding said barcode.

26. The portable electronic device of claim 23, further comprising a light for illuminating said objects.

27. The portable electronic device of claim 23, wherein, provided said device is oriented to receive a sufficient portion of a barcode image on a portion of said sensing array in which the barcode image is sufficiently focused, said device is operable to decode said barcode image.

28. The portable electronic device of claim 23, wherein various portions of a barcode are brought into focus by said device being angled to capture said various portions on a region of said sensing array that focuses images at the distance between said device and said various portions.

29. The portable electronic device of claim 28, further comprising a software stitching program for recreating said barcode from said image data; and wherein:
said various portions of said barcode are stitched together to recreate said barcode.

30. The portable electronic device of claim 29, wherein said barcode is a linear barcode.

31. The portable electronic device of claim 29, wherein said barcode is a two-dimensional barcode.

32. The portable electronic device of claim 23, wherein said portable electronic device is a digital camera.

33. The portable electronic device of claim 23, wherein said portable electronic device is a personal digital assistant.

34. The portable electronic device of claim 23, wherein said portable electronic device is a mobile telephone.

* * * * *